Nov. 19, 1929.  J. A. BROOKS  1,736,695
GAS ELECTRIC CAR
Filed Oct. 11, 1928  3 Sheets-Sheet 1
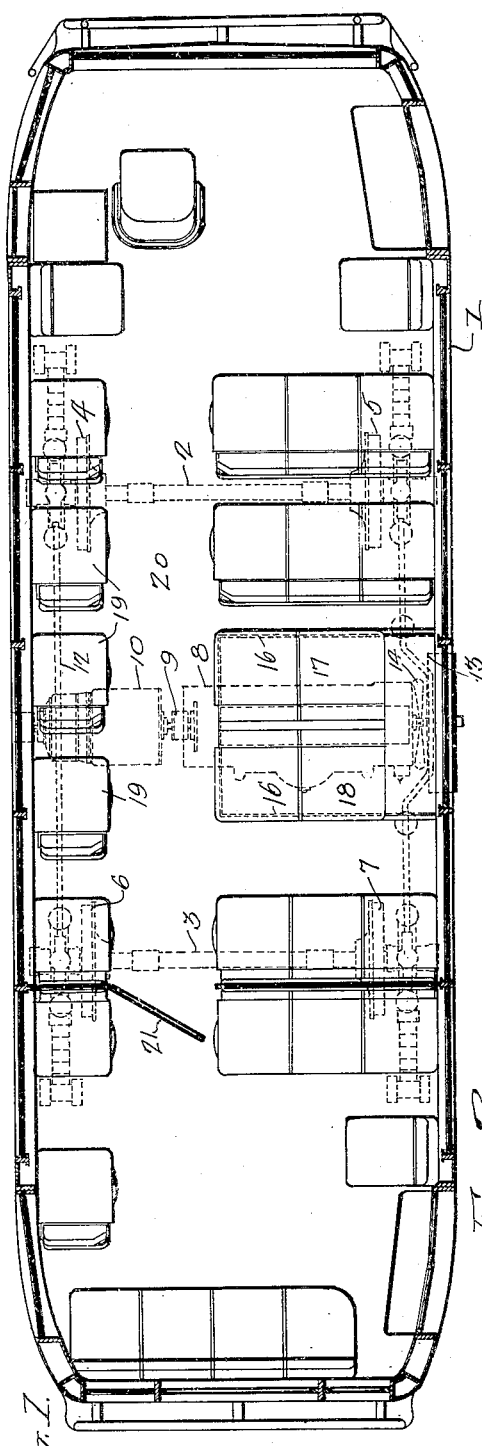
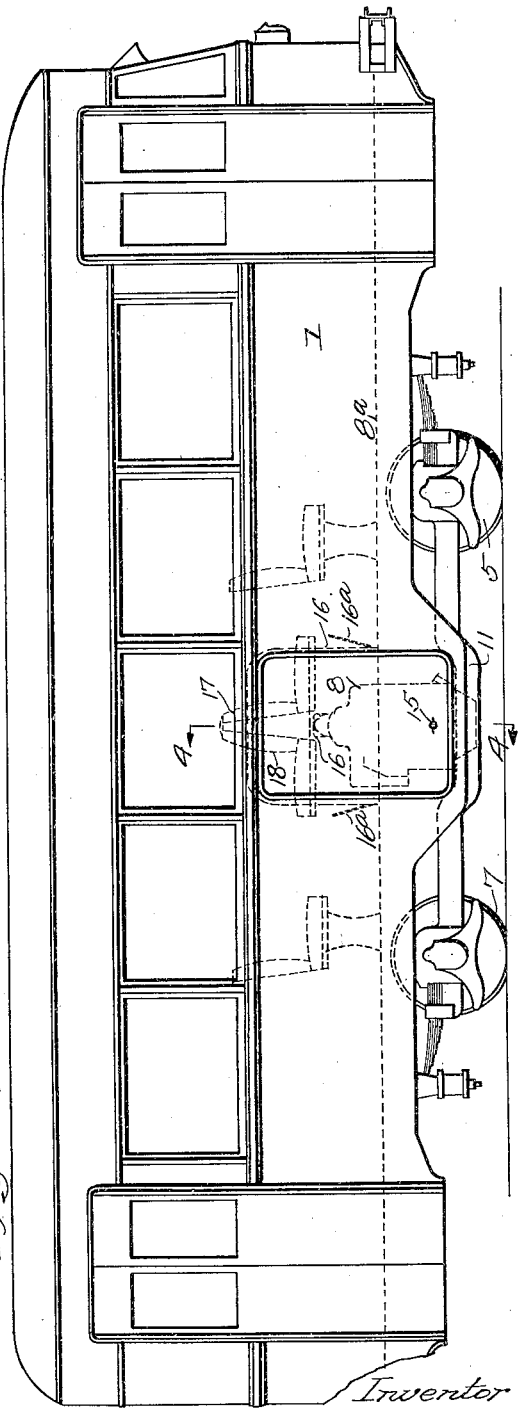

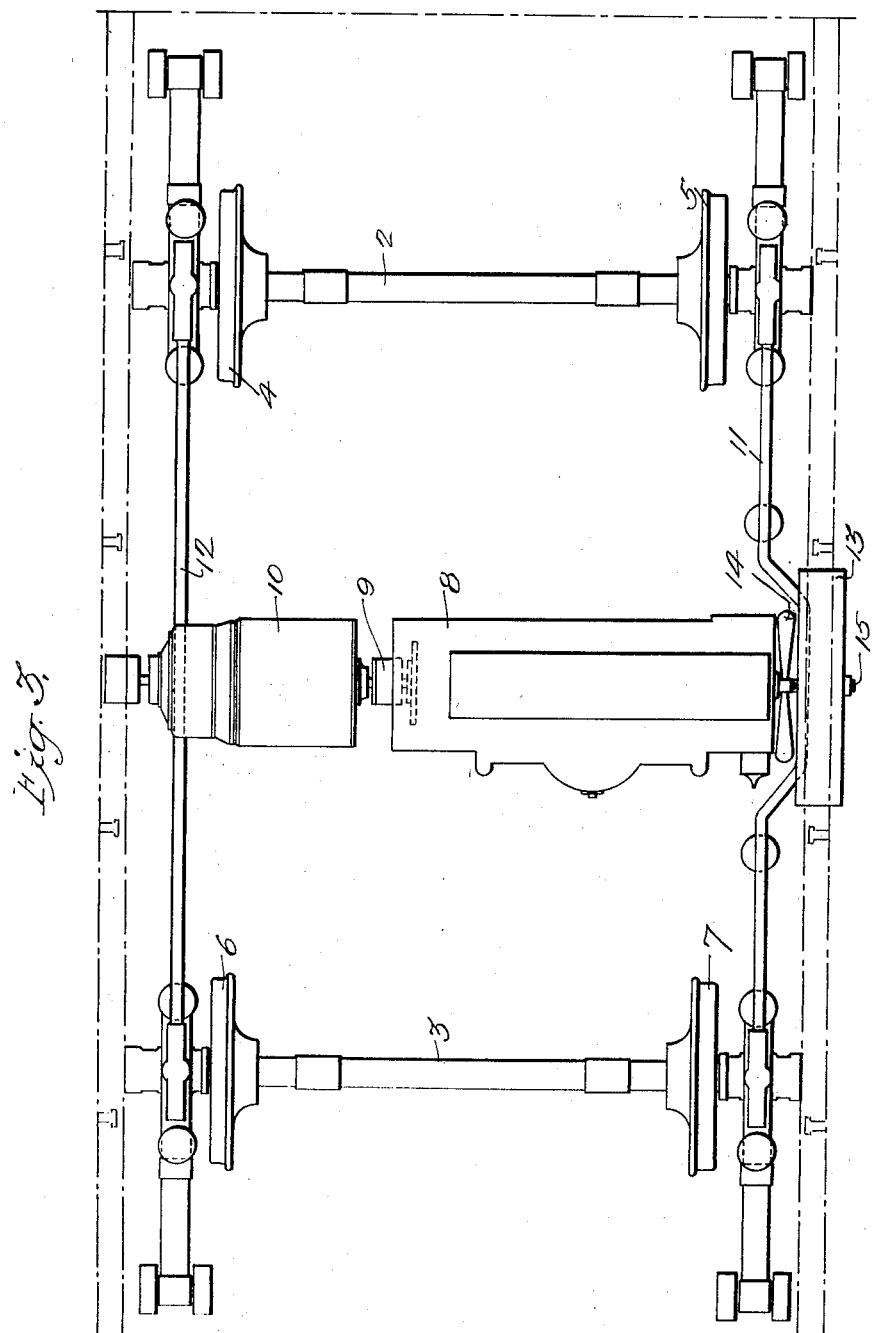

Nov. 19, 1929.  J. A. BROOKS  1,736,695
GAS ELECTRIC CAR
Filed Oct. 11, 1928  3 Sheets-Sheet 3

Inventor
James A Brooks
by his Attorneys.
Howson & Howson

Patented Nov. 19, 1929

1,736,695

UNITED STATES PATENT OFFICE

JAMES A. BROOKS, OF KIRKLYN, PENNSYLVANIA, ASSIGNOR TO THE J. G. BRILL COMPANY, OF PHILADELPHIA, PENNSYLVANIA, A CORPORATION OF PENNSYLVANIA

GAS-ELECTRIC CAR

Application filed October 11, 1928. Serial No. 311,811.

This invention relates to gas-electric cars and is more particularly concerned with a gas-electric car having a prime mover centrally located therein.

An object of the invention is to produce a gas-electric car having a prime mover and a generator located transversely of the car body.

Another object is to produce a gas-electric car having a prime mover and generator located transversely of the car at the center thereof.

Still another object is to produce a gas-electric car having a prime mover and a generator geared thereto, the two being located transversely of the car body and at the center thereof, the prime mover being boxed in and having seats arranged over the housing.

Yet another object is to arrange seats back-to-back over a housing for a prime mover located transversely of a gas-electric car.

Another object is to produce a gas-electric car having a prime mover located transversely thereof in which the crank handle for the prime mover is located adjacent one side of the car.

Other objects will appear hereinafter.

In the drawings which illustrate one modification of my invention,

Fig. 1 is a transverse section through a car employing my invention;

Fig. 2 is a side elevation thereof;

Fig. 3 is a schematic plan of the prime mover and generator hook-up; and

Figure 4:
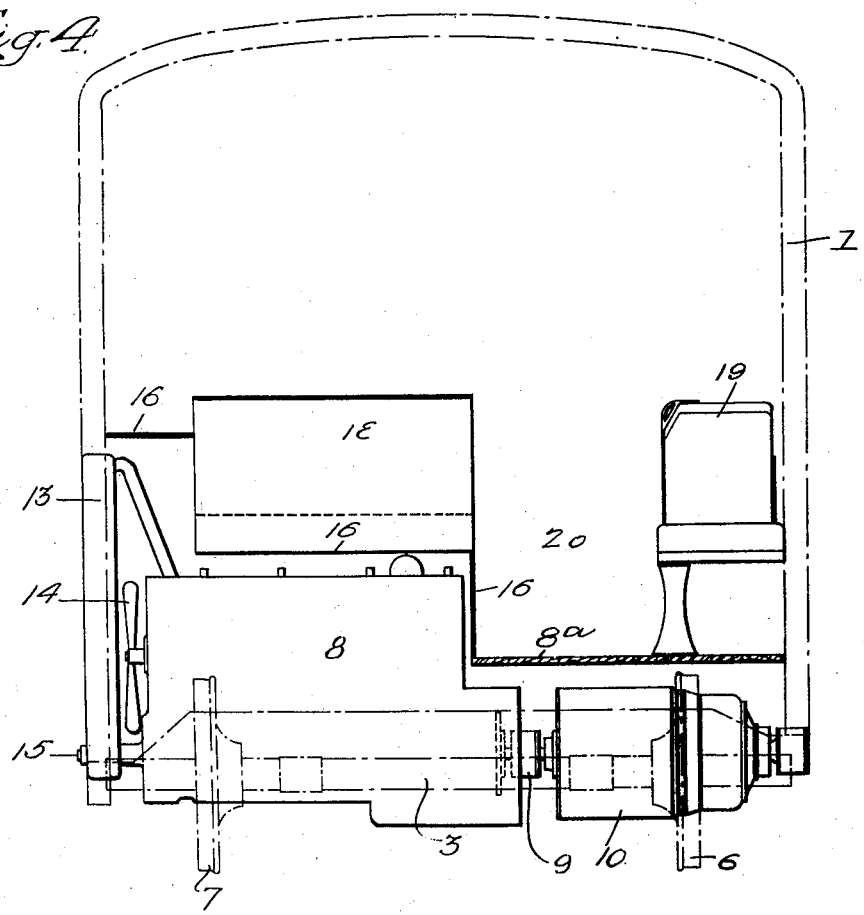
Fig. 4 is a section taken on line 4—4 of Fig. 2.

At 1 is broadly indicated a car body having axles 2 and 3 provided with wheels 4, 5, 6 and 7. It is to be understood that the number of axles may be varied at will, and that 4 or 6-wheel trucks may be utilized in lieu of the axles if desired. In any case, such axles or trucks will be supplied with the conventional type of motors, not shown.

A prime mover, illustrated at 8 is located transversely of the car body and by the usual connection 9 is geared directly to a generator 10. The car frame is preferably depressed at 11 to provide a seat for the prime mover 8. In this manner, it is possible to seat the prime mover in such a manner as to take up but little of the space within the car interior. Inasmuch as the generator 10 does not extend upwardly to a great height, it is unnecessary in the ordinary instance to depress the portion of the frame indicated at 12 to provide accommodation therefor. The prime mover 8 is provided with a fan 14 and a radiator 13 arranged on the exterior of the car.

It will be noted that the crank shaft terminates at 15, adjacent one of the car sides, and consequently it is possible to readily crank the prime mover. Inasmuch as the prime mover extends upwardly into the car interior, it is preferably boxed over by a suitable housing 16. In the present instance, doors 16$^a$ are hinged to the housing 16, to permit access to the prime mover. As shown, this housing provides a support for two seats 17 and 18, preferably located back-to-back. It is of course understood that these seats may be located in any convenient manner, and that if desired, but a single seat may be employed.

Single seats 19 preferably extend along the opposite side of the car, thus providing a passageway 20 extending substantially the length of the car. These seats 19 may be of any conventional type inasmuch as the generator is located entirely beneath the floor 8$^a$ of the car. In the present instance, the passageway 20 is provided with a door 21 which separates the car into front and rear sections, the rear section being preferably employed as a smoking compartment.

As a result of this construction, the prime mover and generator are located in such a position as to be readily accessible, and to take up as little of the available load-carrying space as possible, the space where the prime mover protrudes through the car flooring being utilized by the employment of an ingenious expedient to provide a frame for a plurality of car seats.

As will be readily understood, the invention is susceptible to numerous modifications, and it is intended that it be limited only by the scope of the appended claims.

I claim:

1. In a gas-electric car, a frame having a central depression in one side thereof, the opposite side being continuous, a prime mover extending transversely of said car and seated in said depression, and a generator connected thereto and in line therewith, the generator lying entirely underneath the floor of said car, and the prime mover extending partly therethrough, whereby seats may be supported from the floor over the generator, and by a housing over the prime mover.

2. In a gas-electric car having a frame with a depressed central portion, a prime mover located transversely of said car, and seated in said depression, said prime mover extending upwardly over the car floor, a housing over said prime mover and seats arranged back-to-back and mounted on said housing.

3. In a gas-electric car, a plurality of axles, a frame mounted on said axles, and extending therebetween, and provided with a central depression, a prime mover arranged transversely of said car and seated in said depression, said prime mover extending upwardly through the floor of said car, a housing covering said prime mover, a plurality of seats carried by said housing, a door in said housing permitting access to the prime mover, and a radiator arranged exterior of the car for providing a cooling medium for the prime mover.

JAMES A. BROOKS.